(12) United States Patent  
Bland et al.

(10) Patent No.: US 8,578,396 B2  
(45) Date of Patent: *Nov. 5, 2013

(54) DEFERRED CONTROL OF SURROGATE KEY GENERATION IN A DISTRIBUTED PROCESSING ARCHITECTURE

(75) Inventors: Michael Alan Bland, Boulder, CO (US); Stephan Edward Friedl, Frederick, CO (US); Terry Don Jennings, Westminster, CO (US); Jeffrey James Olson, Boulder, CO (US); Richard Shaffer Youngkin, Littleton, CO (US)

(73) Assignee: Avaya Inc., Basking Ridge, NJ (US)

( * ) Notice: Subject to any disclaimer, the term of this patent is extended or adjusted under 35 U.S.C. 154(b) by 502 days.

This patent is subject to a terminal disclaimer.

(21) Appl. No.: 12/789,038

(22) Filed: May 27, 2010

(65) Prior Publication Data

US 2010/0235371 A1   Sep. 16, 2010

Related U.S. Application Data

(62) Division of application No. 11/199,828, filed on Aug. 8, 2005, now Pat. No. 7,779,042.

(51) Int. Cl.
*G06F 9/44* (2006.01)
*G06F 17/30* (2006.01)

(52) U.S. Cl.
USPC ............................ 719/318; 707/802

(58) Field of Classification Search
USPC .................... 719/310, 318; 707/802
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

US 6,537,685, 3/2003, Fisher et al. (withdrawn).

(Continued)

*Primary Examiner* — Van Nguyen
(74) *Attorney, Agent, or Firm* — Sheridan Ross P.C.

(57) ABSTRACT

An event reporting system includes a computational component 228 operable (a) to receive notification of a change to an attribute of an entity, the entity, prior to the change, being associated with a first surrogate key, and (b) to defer the use of a second surrogate key for the entity until a selected time. The second surrogate key was generated to reflect the change.

19 Claims, 5 Drawing Sheets

(56) References Cited

U.S. PATENT DOCUMENTS

| | | |
|---|---|---|
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A | 7/1998 | Mcmahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | Mcneil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | Mcnerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | Mccalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |

(56) References Cited

U.S. PATENT DOCUMENTS

| | | | |
|---|---|---|---|
| 6,298,062 B1 | 10/2001 | Gardell et al. |
| 6,307,931 B1 | 10/2001 | Vaudreuil |
| 6,324,282 B1 | 11/2001 | Mcillwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,408,066 B1 | 6/2002 | Andruska et al. |
| 6,408,277 B1 | 6/2002 | Nelken |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,446,096 B1 * | 9/2002 | Holland et al. ............... 715/234 |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | Mcfarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | Mcduff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,662,188 B1 | 12/2003 | Rasmussen et al. |
| 6,668,167 B2 | 12/2003 | Mcdowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | Mcillwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,096,216 B2 * | 8/2006 | Anonsen ................... 707/781 |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,130,856 B2 * | 10/2006 | Anonsen ................... 707/781 |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 * | 1/2007 | Harter et al. ................. 707/792 |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,373,341 B2 | 5/2008 | Polo-Malouvier |
| 7,376,127 B2 | 5/2008 | Hepworth et al. |
| 7,386,100 B2 | 6/2008 | Michaelis |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,499,844 B2 | 3/2009 | Whitman, Jr. |
| 7,500,241 B1 | 3/2009 | Flockhart et al. |
| 7,526,440 B2 | 4/2009 | Walker et al. |
| 7,545,761 B1 | 6/2009 | Kalbag |
| 7,545,925 B2 | 6/2009 | Williams |
| 7,567,653 B1 | 7/2009 | Michaelis |
| 7,711,104 B1 | 5/2010 | Flockhart et al. |
| 7,734,032 B1 | 6/2010 | Kiefhaber |
| 7,752,230 B2 | 7/2010 | Bland et al. |
| 7,779,042 B1 | 8/2010 | Bland et al. |
| 7,787,609 B1 | 8/2010 | Flockhart et al. |
| 7,818,196 B2 * | 10/2010 | Olson ...................... 705/7.15 |
| 7,885,209 B1 | 2/2011 | Michaelis et al. |
| 7,936,867 B1 | 5/2011 | Hill et al. |
| 2001/0011228 A1 | 8/2001 | Shenkman |
| 2001/0034628 A1 | 10/2001 | Eder |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |

(56) References Cited

U.S. PATENT DOCUMENTS

| | | |
|---|---|---|
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2002/0194096 A1 | 12/2002 | Falcone et al. |
| 2003/0004704 A1 | 1/2003 | Baron |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |
| 2003/0144900 A1 | 7/2003 | Whitmer |
| 2003/0144959 A1 | 7/2003 | Makita |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | Mcpartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1 | 9/2004 | Cuckson et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0044375 A1 | 2/2005 | Paatero et al. |
| 2005/0049911 A1 | 3/2005 | Engelking et al. |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0228707 A1 | 10/2005 | Hendrickson |
| 2005/0261035 A1 | 11/2005 | Groskreutz et al. |
| 2005/0283393 A1 | 12/2005 | White et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1 | 2/2006 | Joseph et al. |
| 2006/0056598 A1 | 3/2006 | Brandt et al. |
| 2006/0058049 A1 | 3/2006 | McLaughlin et al. |
| 2006/0100973 A1 | 5/2006 | McMaster et al. |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbarth et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0112953 A1 | 5/2007 | Barnett |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |
| 2009/0193050 A1 | 7/2009 | Olson |
| 2009/0228474 A1 | 9/2009 | Chiu et al. |

FOREIGN PATENT DOCUMENTS

| | | |
|---|---|---|
| EP | 0501189 | 9/1992 |
| EP | 0576205 | 12/1993 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| EP | 1761078 | 3/2007 |
| GB | 2273418 | 6/1994 |
| GB | 2290192 | 12/1995 |
| JP | 07-007573 | 1/1995 |
| JP | 2001-053843 | 2/2001 |
| JP | 2002-032977 | 1/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | WO 03/015425 | 2/2003 |

OTHER PUBLICATIONS

U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Flockhart et al.
U.S. Appl. No. 11/242,687, filed Oct. 3, 2005, Krimstock et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick.
U.S. Appl. No. 12/242,916, filed Oct. 1, 2008, Kiefhaber et al.
Definity Communications System Generic 3 Call Vectoring/Expert Agent Selection (EAS) Guide, AT&T publication No. 555-230-520 (1995).
Kimball, et al., "The Complete Guide to Dimensional Modeling." The Data Warehouse Toolkit. 2nd Edition, 2002. Ch. 11, pp. 240-241.
"CS 345: Topics in Data Warehousing," Oct. 5, 2004, 36 pages.
"Learn the structure of an Access database", available at http://office.microsoft.com/en-us/access/HA012139541033.aspx, site updated Nov. 13, 2007, pp. 1-4.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Still Leaving It to Fate?: Optimizing Workforce Management", Durr, William Jr., Nov. 2001.
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.

(56) References Cited

OTHER PUBLICATIONS

"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.
Andy Zmolek; "SIMPLE and Presence: Enterprise Value Propositions," Avaya presentation, 16 pages, presented Jan. 24, 2002.
Aspect—"Analysis and Reporting," http://aspect.com/products/analysis/index.cfm, (Copyright 2005) (1page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Bentley, "Metadata: Everyone Talks About It, But What Is It?" Proceedings of the Twenty-Sixth Annual SAS Users Group International Conference: SAS Institute Inc., 2001, Paper 125-26, 5 pages.
Berners-Lee et al.; "Uniform Resource Identifiers (URI); Generic Syntax," Network Working Group, Request for Comments 2396 (Aug. 1998), 38 pages.
Bill Michael, "The Politics of Naming" www.cConvergence.com (Jul. 2001) pp. 31-35.
Bischoff et al. "Data Ware House Building Method—practical advices telled by persons having experience and experts", Kyouritsu Shuppan Corp. May 30, 2000, first edition, pp. 197-216.
Chavez, David, et al., "Avaya MultiVantage Software: Adapting Proven Call Processing for the Transition to Converged IP Networks," Avaya, Inc., Aug. 2002.
Cherry, "Anger Management," IEEE Spectrum (Apr. 2005) (1 page).
Coles, Scott, "A Guide for Ensuring Service Quality in IP Voice Networks," Avaya, Inc., 2002, pp. 1-17.
Creating and Using Data Warehouse Dimension Tables (Microsoft) copyright 2005, http://msdn.microsoft.com/library/en-us/createdw/createdw_10kz.asp?frame=true, 3 pages.
Creating and Using Data Warehouse—Using Dimensional Modeling (Microsoft) downloaded May 18, 2005 http://msdn.microsoft.com/library/en-us/createdw/createdw_39z.asp?frame=true 1 page.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
Data Warehouse—Surrogate Keys, Keep Control Over Record Identifiers by Generating New Keys for the Data Warehouse, Ralph Kimball, May 1998, 4 pages.
Data Warehouse Designer—Design Constraints and Unavoidable Realities, No design Problem in School was This Hard, Ralph Kimball, Sep. 3, 2002, 3 pages.
Data Warehouse Designer—An Engineer' s View—Its' Worthwhile to Remind Ourselves Why We Build Data Warehouses the Way We Do, Ralph Kimball, Jul. 26, 2002, 3 pages.
Data Warehouse Designer—Divide and Conquer, Build Your Data Warehouse One Piece at a Time, Ralph Kimball, Oct. 30, 2002, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Three: Handling Time, Ralph Kimball, Apr. 22, 2003, 3 pages.
Data Warehouse Designer—The Soul of the Data Warehouse, Part Two: Drilling Across, Ralph Kimball, Apr. 5, 2003, 3 pages.
Data Warehouse Designer—Two Powerful Ideas, The Foundation for Modern Data Warehousing, Ralph Kimball, Sep. 17, 2002, 3 pages.
Data Warehouse Designer Fact Tables and Dimension, Jan. 1, 2003, http://www.inteeigententerprise.com/030101/602warehouse1_1.jhtml, Ralph Kimball, 3 pages.
Dawson et al.; "Vcard MIME Directory Profile," Network Working Group (Sep. 1998), available at http://www.ietf.org/rfc/rfc2426.txt?number=2426, 40 pages.
Dawson, "NPRI's Powerguide, Software Overview" Call Center Magazine (Jun. 1993), p. 85.

(56) References Cited

OTHER PUBLICATIONS

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Dillion, "Renaming fields and tracing dependencies", available at http://allenbrowne.com/ser-41.html, Nov. 2003, updated May 2006, 1 page.

DMReview—Business Dimensional Modeling: The Logical Next Step: Translating the BDM, Laura Reeves, published May 2004, 4 pages.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, 1999, 8 pages.

E. Veerman, "Designing a Dimensional Model", date unknown, 38 pages.

Fielding et al.; "Hypertext Transfer Protocol—HTTP/1.1," Network Working Group, Request for Comments 2068 (Jan. 1997), 152 pages.

Foster, Robin, et al., "Avaya Business Advocate and its Relationship to Multi-Site Load Balancing Applications," Avaya, Inc., Mar. 2002, 14 pages.

Fundamentals of Data Warehousing—Unit 3—Dimensional Modeling, Fundamentals of Data Warehousing, copyright 2005—Evolve Computer Solutions, 55 pages.

G. Hellstrom et al., "RFC 2793—RTP Payload for Text Consersation," Network Working Group Request for Comments 2793 (May 2000), available at http://www.faqs.org/rfcs/rfc2793.html, 8 pages.

G. Klyne; "A Syntax for Describing Media Feature Sets," Network Working Group (Mar. 1999), available at http://www.ietf.org/rfc/rfc2533.txt?number=2533, 35 pages.

G. Klyne; "Protocol-independent Content Negotiation Framework," Network Working Group (Sep. 1999), available at http://www.ietf.org/rfc/rfc2703.txt?number=2703, 19 pages.

G. Wiederhold, "Mediation to Deal with Heterogeneous Data Sources", Stanford University, Jan. 1999, 19 pages.

Geotel Communications Corporation Web site printout entitled "Intelligent CallRouter" Optimizing the Interaction Between Customers and Answering Resources., 1998, 6 pages.

Glossary—Curlingstone Publishing, http://www.curlingstone.com/7002/7002glossary.html, downloaded May 24, 2005, 11 pages.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.

Holtman et al.; "HTTP Remote Variant Selection Algorithm—RVSA/1.0," Network Working Group (Mar. 1998), available at http://www.ietf.org/rfc/rfc2296.txt?number=2296, 13 pages.

Holtman et al.; "Transparent Content Negotiation in HTTP," Network Working Group (Mar. 1998), available at http://www.ietf.org/rfc/rfc2295.txt?number=2295, 55 pages.

Intelligent Enterprise Magazine—Data Warehouse Designer: Fact Tables and Dimension, downloaded May 18, 2005, http://www.intelligententerprise.com/030101/602warehouse1_1.jhtml, 7 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.

Kimball, et al., "Practical Techniques for Extracting, Cleaning, Conforming, and Delivering Data." The Data Warehouse ETL Toolkit. 2004. Ch. 5, pp. 170-174.

Koutarou, "Building a Framework for EC using Hibernate, OSWorkflow", JAVA Press, Japan, Gujutsu Hyouron Company, vol. 25, 2004, pp. 132-147.

L. Cabibbo et al., "An Architecture for Data Warehousing Supporting Data Independence and Interoperability", International Journal of Cooperative Information Systems, Nov. 2004, 41 pages.

Lamel et al., "Language Identification Using Phone-Based Acoustic Likelihood," IEEE International Conference on Acoustics, Speech, and Signal Processing, 1994, vol. 1, pp. 293-296.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

Microsoft Office Animated Help Tool, date unknown, 1 page.

Microsoft R Access 97 for Windows R Application development guide, Ver. 8.0, Microsoft Corp., a first version, pp. 569-599.

MIT Project Oxygen, Pervasive, Human-Centered Computing (MIT Laboratory for Computer Science) (Jun. 2000) pp. 1-15.

Moss et al., "The Importance of Data Modeling as a Foundation for Business Insight," copyright 2004, 38 pages.

Multi-Dimensional Modeling with BW ASAP for BW Accelerator Business Information Warehouse, copyright 2000, 71 pages.

NICE Systems—"Insight from Interactions," "Overwhelmed by the Amount of Data at your Contact Center?" http://www.nice.com/products/multimedia/analyzer.php, (Printed May 19, 2005) (2 pages).

NICE Systems—"Multimedia Interaction Products," "Insight from Interactions," http://www.nice.com/products/multimedia/contact_centers.php (Printed May 19, 2005) (3 pages).

Nortel—"Centrex Internet Enabled Call Centers," http://www.products.nortel.com/go/product_assoc.jsp?segId=0&parID=0&catID=-9191&rend_id . . . (Copyright 1999-2005) (1page).

Presentation by Victor Zue, The MIT Oxygen Project, MIT Laboratory for Computer Science (Apr. 25-26, 2000) 9 pages.

Richard Shockey, "ENUM: Phone Numbers Meet the Net" www.cConvergence.com (Jul. 2001) pp. 21-30.

Rose et al..; "The APEX Presence Service," Network Working Group (Jan. 14, 2002), available at http://www.ietf.org/internet-drafts/draft-ietf-apex-presence-06.txt, 31 pages.

Sarda, "Temporal Issues in Data Warehouse Systems", 1999, Database Applications in Non-Traditional Environments (DANTE'99), S. 27, DOI: 10.1109/DANTE.1999.844938.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

Snape, James, "Time Dimension and Time Zones." 2004. pp. 1-10. http://www.jamessnape.me.uk/blog/CommentView,gui,79e910a1-0150-4452-bda3-e98df.

Songini, "ETL QuickStudy," ComputerWorld, accessed at http://www.computerworld.com/databasetopics/businessintelligence/datawarehouse/story/ . . . , copyright 2005, 5 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.

Thayer Watkins, "Cost Benefit Analysis", 1999, San Jose State University Economics Department, Web Archive http://web.archive.org/web/19990225143131/http://www.sjsu.edu/faculty/watkins/cba.htm.

Official Action (Restriction Requirement) for U.S. Appl. No. 11/199,828, mailed Jun. 23, 2009.

Official Action for U.S. Appl. No. 11/199,828, mailed Oct. 27, 2009.

(56) References Cited

OTHER PUBLICATIONS

Notice of Allowability for U.S. Appl. No. 11/199,828, mailed Apr. 12, 2010.

Background of the Invention for the above-captioned application filed May 27, 2010 (previously provided).

Akitsu, "An Introduction of Run Time Library for C Program, the fourth round," C Magazine, Jul. 1, 1990, vol. 2(7), pp. 78-83.

Emura, "Windows API Utilization Guide, Points for Knowledges and Technologies," C Magazine, Oct. 1, 2005, vol. 17(10), pp. 147-150.

Examiner's Office Letter (including translation) for Japanese Patent Application No. 2007-043414, mailed Jul. 7, 2010.

U.S. Appl. No. 12/569,581, filed Sep. 29, 2009, Michaelis.

Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom . . . , 1 page.

Overview of Avaya IP Softphone printed on Sep. 15, 2009 from http://support.avaya.com/elmodocs2/ip_softphone/Overview_IP_Softphone_R6.htm, 2 pages.

Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age . . . , 1 page.

Product Description of "Avaya one-X Agent," printed on Sep. 15, 2009 from http://www.avaya.com/usa/product/avaya-one-x-agent, 1 page.

Product Overview of "IP Softphone" printed on Sep. 15, 2009 from http://www.nacr.com/Products.aspx?id=236, 3 pages.

U.S. Appl. No. 11/956,779, filed Dec. 14, 2007, Burritt et al.

Hellstrom, et al., RFC-4103 Protocol, entitled "RTP Payload for Text Conversation," Network Working Group, http://www.rfc-editor.org/rfc/rfc4103.txt, Jun. 2005, 18 pages.

Venkatesan et al., "A Customer Lifetime Value Framework for Customer Selection and Resource Allocation Strategy," Journal of Marketing, Oct. 2004, vol. 68, pp. 106-125.

\* cited by examiner

DEFERRED CONTROL OF SURROGATE KEY GENERATION IN A DISTRIBUTED PROCESSING ARCHITECTURE

CROSS REFERENCE TO RELATED APPLICATION

This application is a divisional of U.S. Ser. No. 11/199,828, filed Aug. 8, 2005 and issued as U.S. Pat. No. 7,779,042 on Aug. 17, 2010, entitled "DEFERRED CONTROL OF SURROGATE KEY GENERATION IN A DISTRIBUTED PROCESSING ARCHITECTURE", the disclosure of which is incorporated herein by reference in its entirety.

FIELD OF THE INVENTION

The present invention is directed generally to event processing and specifically to monitoring agent performance.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

The primary objective of contact center management, including call-distribution algorithms, is to ultimately maximize contact center performance and profitability. An ongoing challenge in contact center administration is monitoring of agent behaviors to optimize the use of contact center resources and maximize agent performance and profitably. Current products for monitoring and reporting on contact center performance, such as Call Management System or CMS™ by Avaya, Inc., are configured as data warehouses that extract data from multiple sources, transform the data into a normalized form, and load the data into the data warehouse database, typically on a batch schedule. Additional calculations and reporting are performed after the batch load.

A common type of data warehouse is based on dimensional modeling. Dimensional modeling is a data model that divides the world into measurements and context. Measurements are usually numeric and taken repeatedly. Numeric measurements are facts. Facts are surrounded by textual context in existence when the fact is recorded. Context is often subdivided into dimensions. Fact tables are used in dimensional modeling to logically model measurements with multiple foreign keys referring to the contextual entities. The contextual entities each have an associated primary key. A "key" is a data element (e.g., attribute or column) that identifies an instance of an entity or record in a collection of data, such as a table. A "primary key" is a column or combination of columns whose values uniquely identify a row in a table or is the attribute or group of attributes selected from the candidate keys as the most suitable to uniquely identify each instance of an entity. A "foreign key" refers to a column or combination of columns whose values are required to match a primary key in another table or is a primary key of a parent entity that contributes to a child entity across a relationship. Types of primary keys include a natural key, or a key having a meaning to users, and a surrogate key, or a key that is artificially or synthetically established, meaningless to users, and used as a substitute for a natural key.

If the same entity (e.g., agent) is represented on multiple data sources (e.g., inbound call system and outbound call system) by different natural keys, a traditional data warehouse generates and assigns a surrogate key to identify the entity. The surrogate key is an internal identifier managed by the data warehouse. For example, in a contact center an agent may handle inbound calls from one system and outbound calls from another system, with different identities on each system. Data warehouses commonly process each data source independently, performing data correlation across sources at a later time. This approach is normally unworkable when events for the same entity from multiple sources must be processed simultaneously in real time, such as in the blended inbound/outbound call center. For this reason, existing contact center data warehouse products that combine data from multiple sources appear to merely process each source independently, with little or no correlation when the same entity is represented on multiple sources.

Some data models specify a behavior known as a type 2 slowly changing dimension. A type 2 dimension tracks the history of changes to an entity over time. When an attribute of an entity is changed, such as when a contact center agent changes their skill set or group membership, a new surrogate key for that entity is generated, and a new row inserted into the database. Fact data associated with the entity can now be tracked separately for activities that occurred before versus after the change by referencing the appropriate surrogate key.

The traditional technique for handling a type 2 dimension update is to associate the change with a specific point in time. If that point in time occurs in the middle of a logical transaction, there is a potential for performing incorrect data correlation. This problem is exacerbated for real time data warehouse application where the application must handle entities with multiple natural keys that also have multiple surrogate keys due to type 2 dimensions. Because an entity has multiple natural keys, a surrogate key must be used to track fact data for the entity. If the application performs calculations in real time that span a type 2 dimension change that caused a new surrogate key to be created, the result of the calculation may be indeterminate or incorrect. For example, a contact center application may track the amount of time an agent places callers on hold. If a type 2 dimension change occurs to the agent dimension while the agent has a caller on hold, a new surrogate key is generated. The application then cannot easily calculate the hold time because the start and end times are associated with different fact records with different surrogate keys. The problem expands when considering data consistency across individual calls, multiple related calls, or agent login sessions that may span hours.

SUMMARY OF THE INVENTION

These and other needs are addressed by the various embodiments and configurations of the present invention. The present invention is directed generally to sequencing the use of different surrogate keys associated with a common entity.

In a first embodiment, a method for correlating information is provided that includes the steps:

(a) receiving notification of a change to an attribute of an entity, the entity, prior to the change, being associated with a first surrogate key; and (b) deferring the use of a second surrogate key, generated in response to the change, until a selected time. The entity and associated attribute can be context or a measurement. Typically, the entity is a dimension and the attribute is a fact.

In a second embodiment, a method for correlating information is provided that includes the steps:

(a) receiving an event notification, the event notification comprising event information and a natural key;

(b) mapping the natural key to a normalized key; and (c) selecting a first hint for the normalized key, the first hint indicating which of a plurality of surrogate keys associated with the normalized key will be used in a record corresponding to the event information. An event is an occurrence or happening. A normalized key is a type of surrogate key used to reference an entity associated with a natural key. A hint can be any information influencing the selection of a first surrogate key over a second surrogate key. The hint is preferably a form of instruction indicating when a selected surrogate key is valid for use.

In one exemplary configuration, multiple natural keys for the same entity from multiple sources are mapped to the normalized key. Multiple surrogate keys are also maintained to support type 2 dimensions. The normalized key is used to manage facts for an entity prior to storing the facts in the database. When a new type 2 surrogate key is generated, the hint is provided to the event processor, allowing the processor to decide when to allow the new surrogate key to take effect based on knowledge of the entity state or other business conditions. Until the entity is in a state where calculated facts are consistent according to business operations, facts stored in the database are associated with the previous surrogate key.

By using a normalized key that is separate from both the natural keys and the type 2 surrogate keys, it becomes possible to perform calculations for an entity in real time without regard to the multiple representations of the entity at the sources and the multiple type 2 dimension representations in the database. Type 2 dimension semantics are maintained by deferring the time when a new type 2 surrogate key takes effect in the fact data until the entity is in an acceptable state, such as at the end of the current contact or after the agent has completed his or her daily shift. The specific time of deferral is determined in real time by the events processed from the multiple input sources, such as based on rules encoded in a specification or coded in software.

The invention can allow events for the same entity from multiple sources to be consolidated and summarized in real time into a data model that supports type 2 dimension semantics, without introducing data anomalies that could occur due to real time updates to the type 2 surrogate keys.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved event (e.g., contact) processing.

Figure 1:
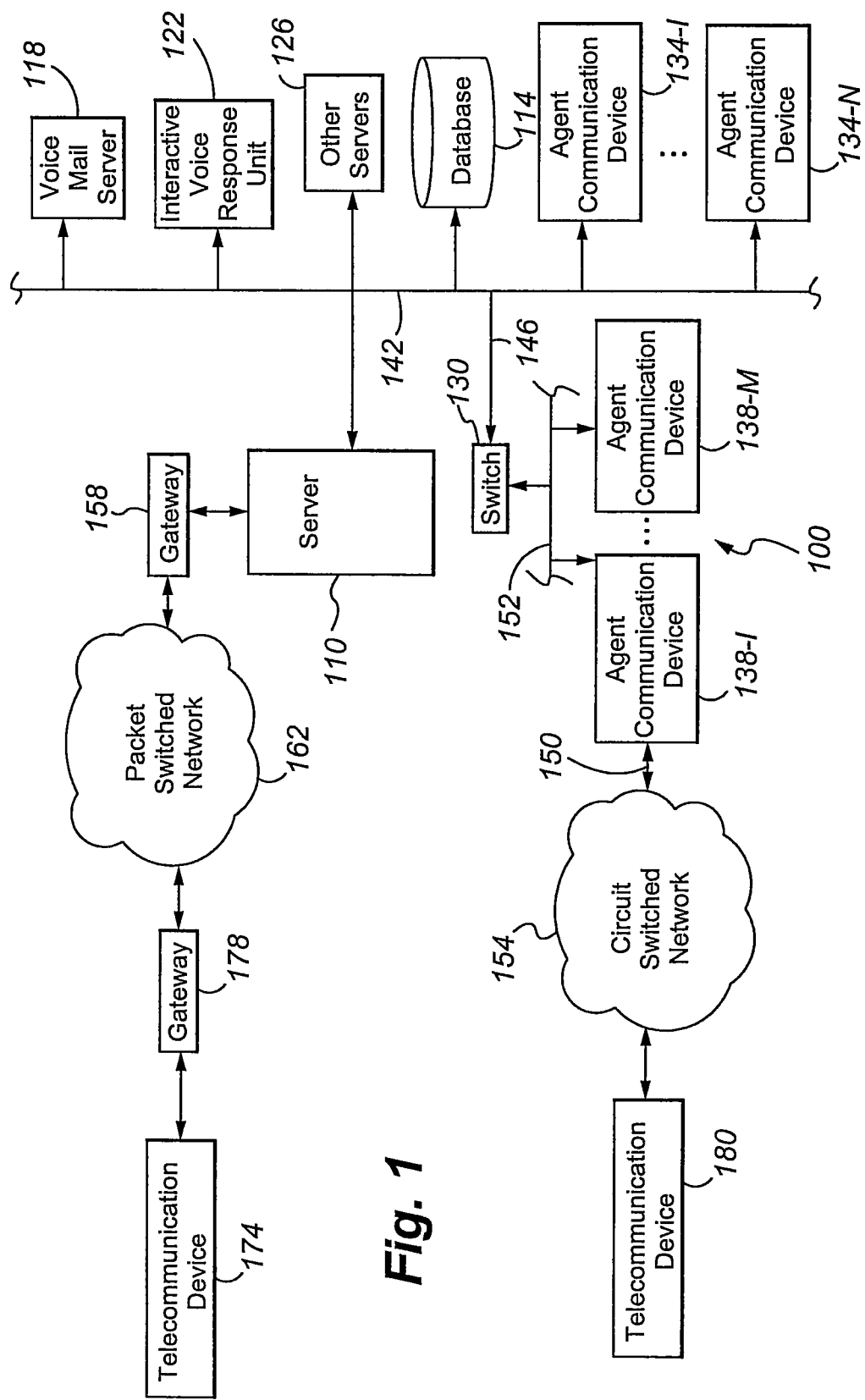
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126 (such as a predictive dialer), a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

Figure 2:
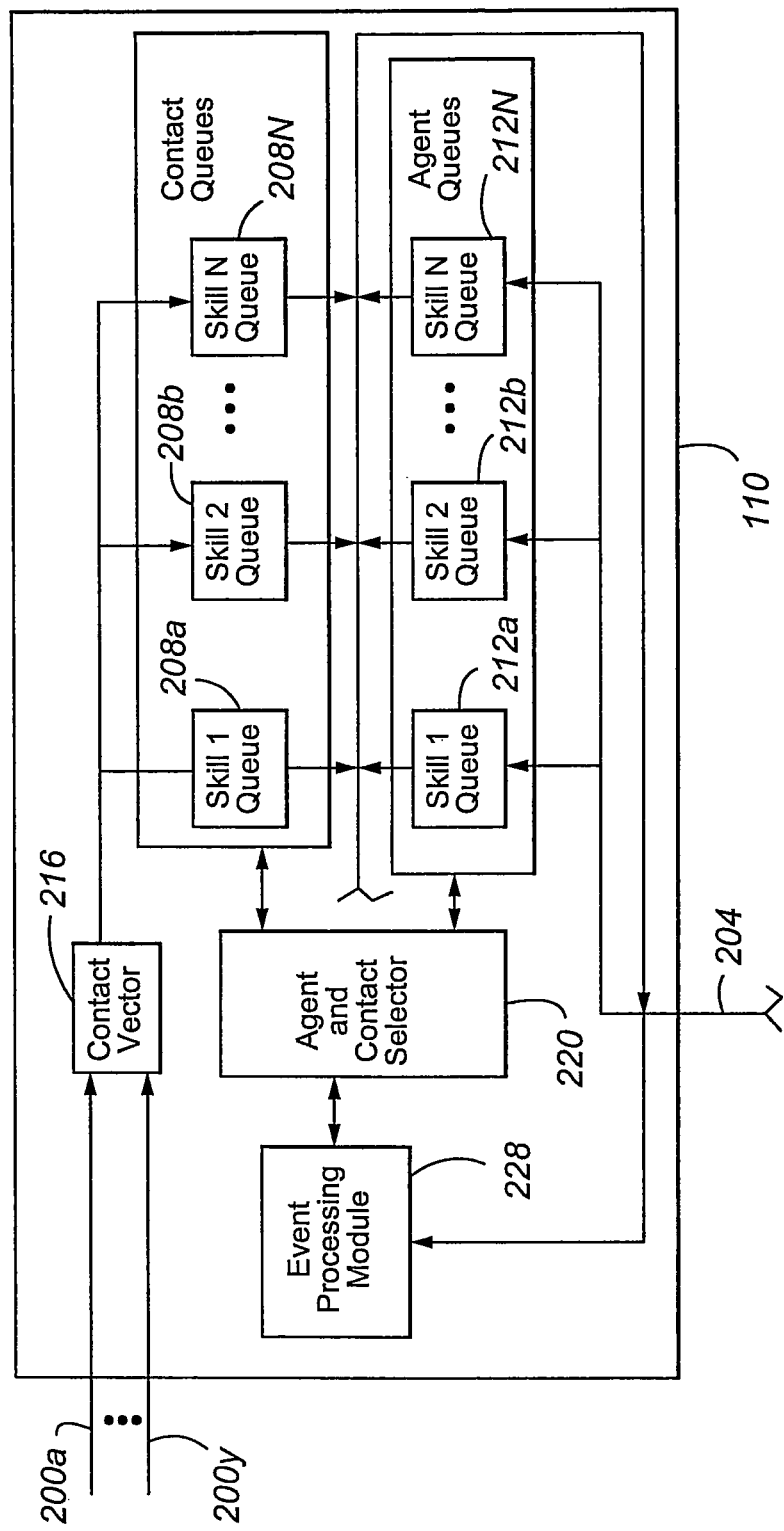
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an event processing module 228, such as a modified form of Basic Call Management System™ or BCMS, Call Management System™, and/or Operational Analyst™ by Avaya, Inc., that gathers call records and contact-center statistics for use in generating contact-center reports.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner. The second telecommunication devices can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second telecommunication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements. As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

Figure 3:
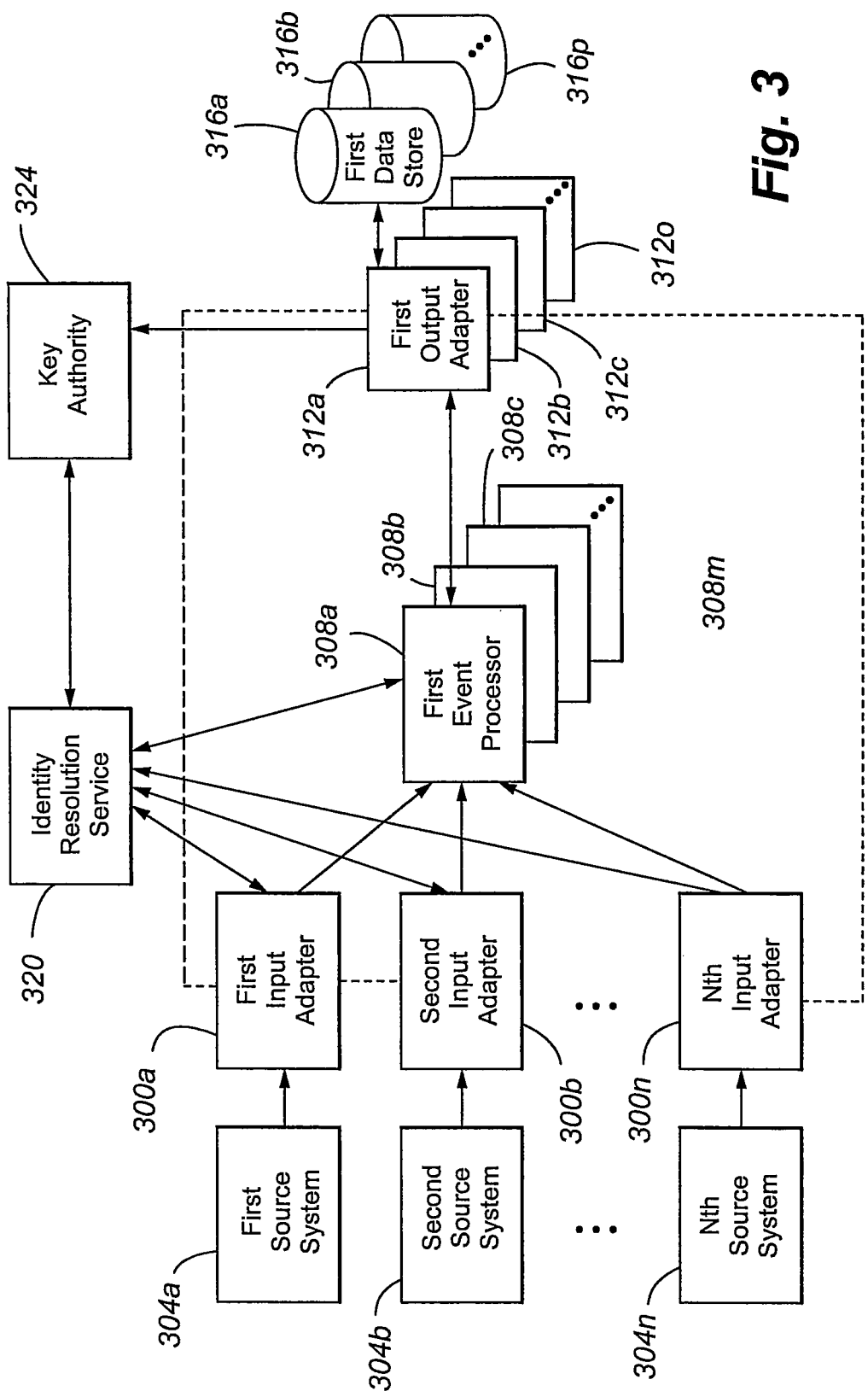
FIG. 3 is a block diagram depicting an embodiment of the event processing module.

FIG. 3 depicts an embodiment of the event processing module 228. The module 228 includes first, second, . . . nth input adapters for normalizing event information received from first, second, . . . nth sources (which may include computational components in the server 110, switch 130, IVR 122, other servers 126, and the like), a plurality of event processors 308a-m for generating event-related data from normalized event information, a plurality of data stores 316a-p for storing the event-related data, a plurality of output adapters 312a-o to effect storage of the event-related data in a data store 316, an Identity Resolution Service or IRS 320 for providing a unique identifier known as the Entity Identifier or EID for each entity instance, and a key authority 324 to generate surrogate keys and hints.

The input adapters 300a-n obtain events from a source system and normalize the received events into normalized event information. Normalized event information is a predefined set of events that conform to specific syntax and semantic rules. The input adapters translate source-specific events from source-specific formats to normalized events. One of the translation functions is the conversion of natural keys to normalized keys, namely EIDs or a type of surrogate key. EIDs are immutable keys that do not change for the life of an entity compared to surrogate keys for type 2 dimensions that often change over time. Another example of normalization is the conversion of time stamps in source notifications to a common time zone. Input adapters normally do not hold state or process events except as necessary to generate normalized event information. The output of the input adapters includes normalized events that identify entities by their EIDs rather than source-specific natural key identifiers.

Event processors 308a-m use the normalized event information to generate detail and/or state and summary data for storage in a data store. Serial data would also be generated by the event processor when there is a distinction between detail and serial data. The event processor rationalizes entity states across multiple sources, producing a single state for each entity instance. Late arriving events can be handled by staging events in the event processor, such as using a lightweight local database. The tolerance for late arriving events is much lower for real-time data than for historical data; therefore, it is possible that the real-time data shows temporarily incorrect state data that is corrected in the historical data by the longer tolerance for late arriving events. In a preferred configuration, different event processors handle real-time and historic events and the events are stored in separate real-time and historic data stores.

The data stores are preferably configured in accordance with dimensional modeling concepts. In other words, facts are associated with context and grouped into fact tables. Context is further subdivided into dimensions. Exemplary dimensions include work item (e.g., type, class, etc.), customer (e.g., identity, class, etc.), agent (e.g., identity, skills, etc.), routing (e.g., how work item was processed/routed, routing destination, etc.), class (e.g., inbound, outbound, internal, external, etc.), time (e.g., time stamp (date and time) of when an event occurred), state (e.g., state of agent, state of customer, state of work item, etc.), exit reason (e.g., reason for state change, etc.,) and delivery method (e.g., direct, distributed, etc.) and/or an action involving one or more of the foregoing, such as arrival of a work item, agent state change, and the like. An event is typically associated with (structured) context. For example, events may be associated with and/or are instances of the foregoing dimensions. A measure refers to a set of events having a defined relationship. Generally, an event is a point in time while a measure is a temporal duration or a count of event occurrences.

The output adapters 312 are responsible for converting processed normalized event information received from the event processors into the form required for an external destination, such as Structured Query Language or SQL, for a database. They perform translation functions, such as converting EID's to the surrogate keys required by the data model but they generally do not hold state or process the events. All context required to generate the output is included in the processed normalized event information, such as in the form of metadata. The output adapters are thus context-free. In one configuration, one or more of the output adapters handles historic events and one or more other output adapters handles real-time events. The historical and real-time output adapters cleanse the data from the disparate event processors, which includes resolving identifiers into surrogate keys, creating new rows based on type 2 dimensions when necessary, generating multiple timestamp formats in different time zones, and the like.

The IRS 320 translates source-specific identifiers or keys into EIDs for each entity instance and provide a hint. As will be appreciated, entities often have multiple natural keys as defined the source systems. For example, an agent who performs inbound and outbound work will have different identifiers on the server 110 and predictive dialing system. Some entities, such as contacts and customers, may be associated with multiple instances of the same type of source, such as when a call is transferred from one site to another or a customer calls into different sites. In all of these cases, the natural keys must be resolved into a single identifier that allows event processing to uniquely identify each source entity. Otherwise the data will be correlated incorrectly, causing erroneous or misleading data to be displayed on reports. The EID can be obtained from tables stored locally to the IRS and/or from the key authority 324.

The key authority 324 manages surrogate keys. When an administration change causes a new surrogate key to be generated, the key authority 324 sends the EID to the IRS along with the hint that a new surrogate key is available. The normalized event notification from the input adapter to the event processor includes the hint as payload along with the EID. The event processor uses the hint and other state information to decide when the new surrogate key should take effect. For example, the new key may take effect after the agent logs out or after the agent's current call completes. The key authority is used by the output adapter to determine the current surrogate key for an entity instance.

The hint is preferably a form of instruction indicating when a surrogate key is valid for use. Examples of hints include a yes/no flag regarding availability of the surrogate key for current use, a date and/or time after which the surrogate key is valid, a signature indicating that the key is valid, an identified event which must occur before the key is valid, a time stamp (such as of the EID request), the surrogate key itself, a sequence number and the like. In one embodiment, the hint is used by the key authority to map from an EID to the valid surrogate key.

Figure 4A:
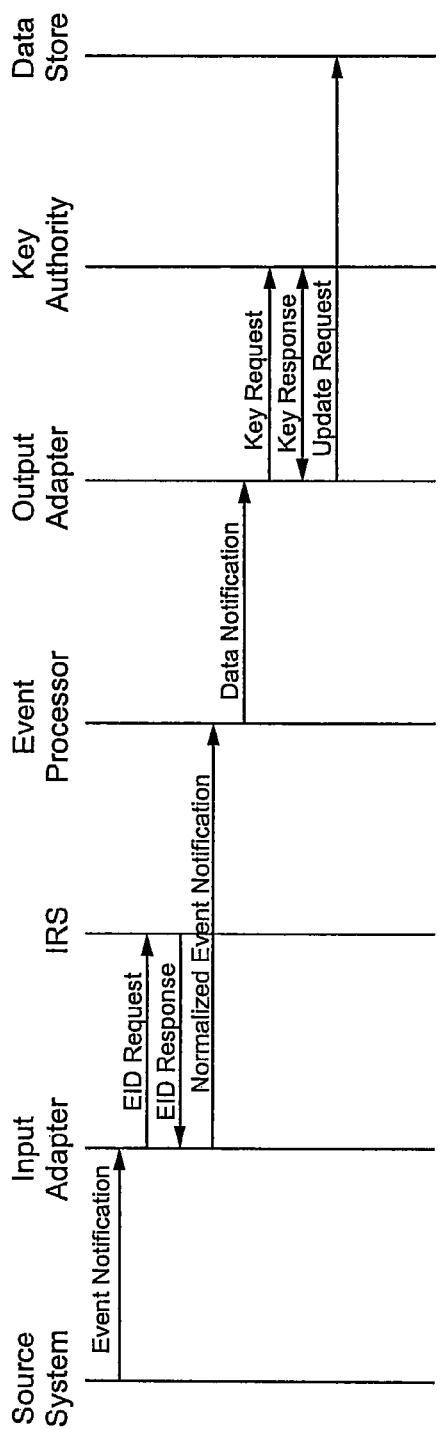
FIG. 4 is a signal flow diagram according to an embodiment of the present invention.
Figure 4B:
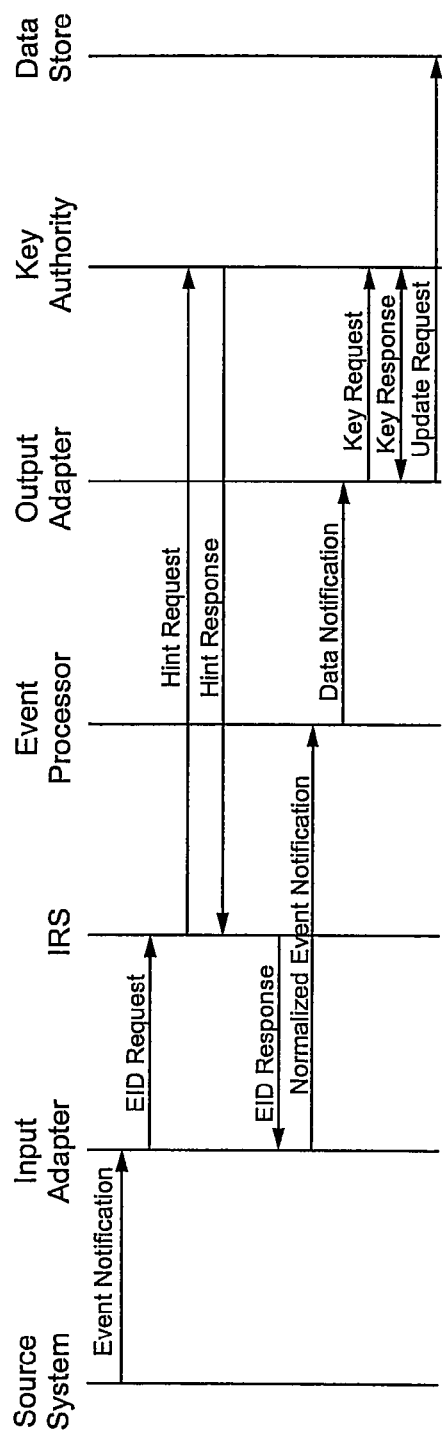

FIGS. 4A-B show differing architectures for signal flows among the above components. FIG. 4A assumes that the IRS maintains a table of EID's, hints, and corresponding natural keys. The key authority periodically updates the IRS table with hints for each EID to reflect administration changes. In FIG. 4B in contrast, the IRS maintains a table of EID's and corresponding natural keys but queries the key authority for the hint corresponding to the EID when an EID request is received.

Referring to FIG. 4A, the initial signal is the event notification signal received by an input adapter from a source system. The event notification signal typically includes event information and one or more natural keys corresponding to the event information. The input adapter forwards an EID request to the IRS. The EID request includes the natural key(s) and optionally selected event information. The IRS maps the natural key to a corresponding EID and hint. The IRS forwards the EID and hint to the input adapter in an EID response. The input adapter then forwards a normalized event notification to the event processor. The normalized event notification includes the EID, hint, and normalized event information. The event processor, after receiving the normalized event notification, processes the normalized event information to yield update data, which will be used to update the corresponding record(s) in the data store. The event processor then forwards a data notification to the output adapter. The data notification includes the EID, hint, and update data. The output adapter, in response to receiving the data notification, forwards a key request to the key authority. The key request includes the EID and hint. The key authority, which maintains a table of EID's and hints and corresponding surrogate keys, maps the EID and hint to yield a surrogate key for use in updating the records in the data store. The surrogate key is returned to the output adapter in a key response. The output adapter then submits an update request containing the surrogate key and normalized information to the application interface of the data store for updating.

Referring to FIG. 4B, the message flow is the same as FIG. 4A with the exception of the signals exchanged between the IRS and key authority. While the key authority in FIG. 4A periodically forwards EID hint updates to the IRS to update the local table of the IRS, the IRS, in FIG. 4B, sends a hint request to the key authority each time an EID request is received. The hint request includes the EID from the local table of the IRS. In this configuration, the local table of the IRS does not include hints. The key authority responds with a hint response including a hint corresponding to the EID.

Figure 5:
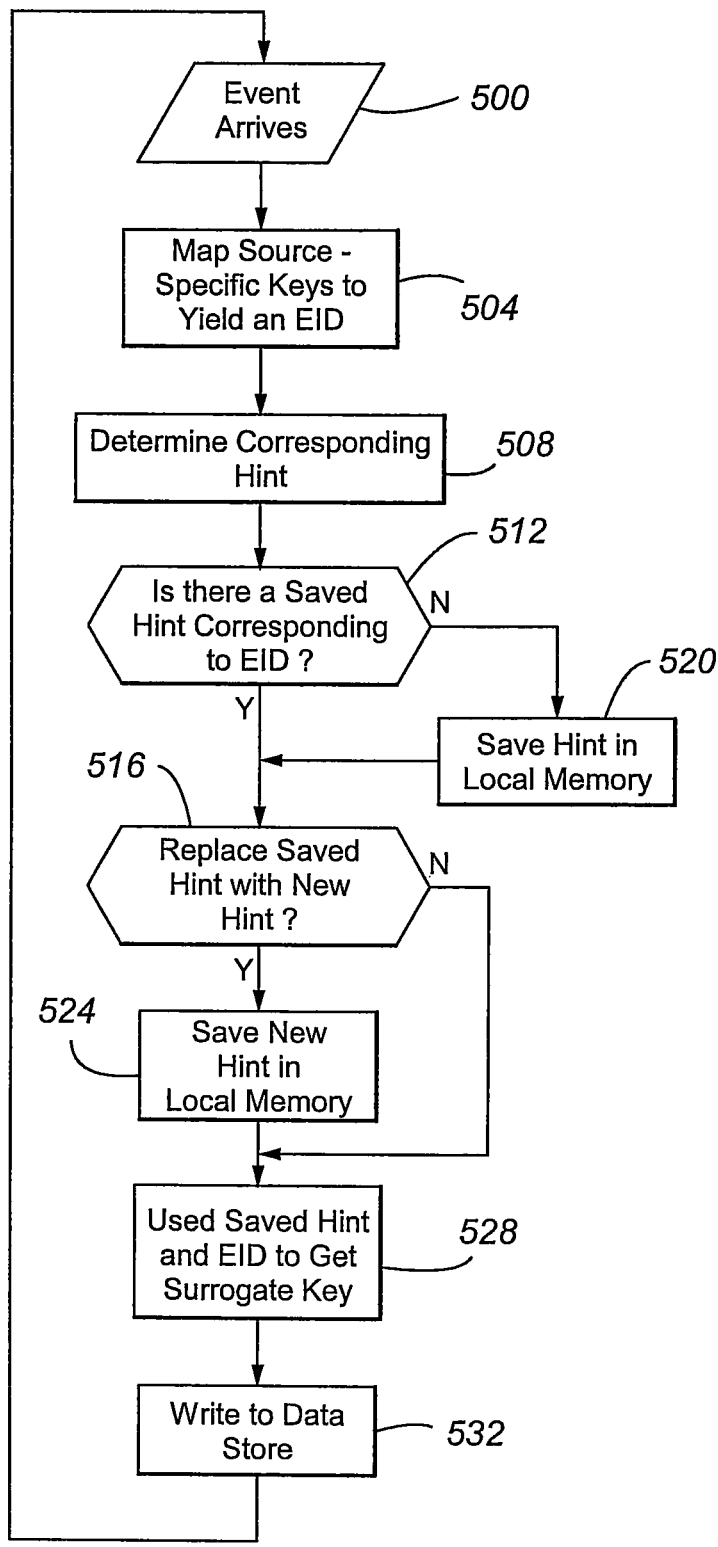
FIG. 5 is a flow chart depicting an operational embodiment of the event processing module.

The operation of the event processing module 228 will now be discussed with reference to FIG. 5.

In box 500, an event notification arrives at an input adapter 300 from a source system 304. In response, the input adapter 300 forwards an EID request to the IRS 320. In step 504, the IRS 320 maps the source-specific key(s), or natural key(s), in the EID request to determine a corresponding pair of EID and hint. Alternatively, the IRS can map to produce an EID and forward the EID to the key authority in a hint request. In either case, the IRS returns the EID and corresponding hint to the input adapter in the EID response. The input adapter then forwards the normalized event notification containing the BID and hint to the event processor.

In decision diamond 512, the event processor determines whether there is a saved hint corresponding to the EID. The event processor maintains a dynamic local table of EID's and, for each EID, a hint that was last used by the event processor for the EID. If there is no saved hint in the local table, the event processor in step 520 saves the hint in local memory. If there is a saved hint in the local table, the event processor in decision diamond 516 determines whether or not to replace the saved hint with a new hint.

The event processor is not required to use only the provided hint but may select a different hint depending on the context of events associated with an entity or other type of dimension. Because the event processor is aware of the current state(s) of source-specific dimensions, such as call state, agent state, and the like, the event processor may replace the provided hint with its own hint to reflect current events. For example if an agent natural key has administratively changed and the key authority hint indicates that a new surrogate key for the agent may now be used, the event processor may question the hint because the event involves a customer contact that the agent has been servicing. If the new surrogate key is used currently, the data structures surrounding the current customer contact would be at best incomplete and at worst misleading. The event processor may therefore replace the hint with a new hint indicating that the old surrogate key is to be used until the current contact is concluded or until the agent's shift is over.

If the event processor determines that the saved hint is to be replaced, processor in step 524 saves the new hint in the local table. If the event processor determines that the saved hint is not to be replaced or after step 524, the processor forwards the data notification to the output adapter.

The output adapter in step 528 uses the hint and EID in the data notification to obtain from the key authority the pertinent surrogate key. This is done by sending to the key authority a key request containing the EID and selected hint. The key authority maps the hint and BID to produce a surrogate key and returns the surrogate key to the output adapter in a key response.

Finally, in step 532 the output adapter sends an update request to the data store to write the data to the store.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for correlating information, comprising:
   receiving an event notification, the event notification comprising event information and a natural key;
   mapping the natural key to a normalized key;
   selecting, by a processor, a first hint for the normalized key, the first hint indicating which of a plurality of surrogate keys associated with the normalized key will be used in a record corresponding to the event information;
   determining whether to use the first hint;
   when the first hint is to be used, mapping the normalized key and first hint to identify a second surrogate key in the plurality of surrogate keys; and
   when the first hint is not to be used, selecting a second hint for the normalized key, the second hint being associated with a first surrogate key in the plurality of surrogate keys.

2. The method of claim 1, further comprising:
   selecting the second surrogate key when the first hint is used and the first surrogate key when the second hint is used; and
   adding a row to a fact table using the selected one of the first and second surrogate keys.

3. The method of claim 2, wherein a data store comprises the fact table.

4. The method of claim 1, wherein the natural key is associated with context.

5. A logic circuit configured to perform the steps of claim 1.

6. The method of claim 1, wherein the first hint is determined by a key authority.

7. The method of claim 1, wherein the first hint comprises at least one of a flag, a date, a time, a signature, an identified event, a time stamp, a surrogate key, and sequence number.

8. The method of claim 1, wherein the surrogate keys are determined by a key authority.

9. The method of claim 1, wherein the second hint is determined by a key authority.

10. The method of claim 1, wherein the method is performed by an input adapter.

11. A non-transitory computer readable medium comprising executable instructions to perform the following steps:
    receiving an event notification, the event notification comprising event information and a natural key;
    mapping the natural key to a normalized key;
    selecting, by a processor, a first hint for the normalized key, the first hint indicating which of a plurality of surrogate keys associated with the normalized key will be used in a record corresponding to the event information;
    determining whether to use the first hint;
    when the first hint is to be used, mapping the normalized key and first hint to identify a second surrogate key in the plurality of surrogate keys; and
    when the first hint is not to be used, selecting a second hint for the normalized key, the second hint being associated with a first surrogate key in the plurality of surrogate keys.

12. The computer readable medium of claim 11, wherein the instructions, when executed, perform the further steps of:
    selecting the second surrogate key when the first hint is used and the first surrogate key when the second hint is used; and
    adding a row to a fact table using the selected one of the first and second surrogate keys.

13. The computer readable medium of claim 12, wherein a data store comprises the fact table.

14. The computer readable medium of claim 11, wherein the natural key is associated with context.

15. The computer readable medium of claim 11, wherein the first hint is determined by a key authority.

16. The computer readable medium of claim 11, wherein the first hint comprises at least one of a flag, a date, a time, a signature, an identified event, a time stamp, a surrogate key, and sequence number.

17. The computer readable medium of claim 11, wherein the surrogate keys are determined by a key authority.

18. The computer readable medium of claim 11, wherein the second hint is determined by a key authority.

19. The computer readable medium of claim 11, wherein the method is performed by an input adapter.

* * * * *